(12) United States Patent
Lo et al.

(10) Patent No.: US 10,025,156 B2
(45) Date of Patent: Jul. 17, 2018

(54) DISPLAY PANEL

(71) Applicant: E Ink Holdings Inc., Hsinchu (TW)

(72) Inventors: Po-Yuan Lo, Hsinchu (TW); Lee-Tyng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 17 days.

(21) Appl. No.: 14/973,744

(22) Filed: Dec. 18, 2015

(65) Prior Publication Data

US 2016/0291438 A1 Oct. 6, 2016

(30) Foreign Application Priority Data

Apr. 2, 2015 (TW) .............................. 104110968 A

(51) Int. Cl.
*G02B 26/00* (2006.01)
*G02B 26/08* (2006.01)
*G02F 1/29* (2006.01)
*G02F 1/167* (2006.01)
*G02F 1/1333* (2006.01)

(52) U.S. Cl.
CPC ........ *G02F 1/167* (2013.01); *G02F 1/133305* (2013.01); *G02F 1/133345* (2013.01); *G02F 1/13336* (2013.01); *G02F 2001/133388* (2013.01)

(58) Field of Classification Search
USPC ....... 359/237, 242, 251, 252, 253, 254, 265, 359/267, 271, 272, 269, 290, 291, 292, 359/295, 296
See application file for complete search history.

(56) References Cited

U.S. PATENT DOCUMENTS

| 7,903,399 B2 | 3/2011 | Kim et al. |
| 8,253,883 B2 | 8/2012 | Mimura |
| 2008/0236905 A1 | 10/2008 | Endo et al. |

(Continued)

FOREIGN PATENT DOCUMENTS

| CN | 103249260 A | 8/2013 |
| CN | 103810940 A | 5/2014 |

(Continued)

OTHER PUBLICATIONS

Corresponding Taiwanese Office Action that these art references were cited dated Jan. 7, 2016.

*Primary Examiner* — Brandi Thomas
(74) *Attorney, Agent, or Firm* — CKC & Partners Co., Ltd.

(57) ABSTRACT

A display panel includes a flexible substrate, a first conductive layer, an insulating layer, a second conductive layer and a display layer. The flexible substrate includes a central area and at least one peripheral area. The first conductive layer is disposed on the flexible substrate. The insulating layer is disposed on the first conductive layer. The insulating layer includes a central insulating portion and at least one peripheral insulating portion. The peripheral insulating portion is located above the peripheral area. The central insulating portion is located above the central area. The peripheral insulating portion is more flexible than the central insulating portion. The second conductive layer is disposed on the insulating layer, and the insulating layer separates the first conductive layer from the second conductive layer. The display layer is disposed on the second conductive layer.

9 Claims, 7 Drawing Sheets

(56) References Cited

U.S. PATENT DOCUMENTS

| | | |
|---|---|---|
| 2008/0247128 A1 | 10/2008 | Khoo |
| 2011/0210937 A1 | 9/2011 | Kee et al. |
| 2013/0155032 A1 | 6/2013 | Kim |
| 2013/0257696 A1 | 10/2013 | Ha et al. |
| 2014/0002385 A1 | 1/2014 | Ka et al. |
| 2014/0035794 A1 | 2/2014 | Chen |
| 2014/0139447 A1 | 5/2014 | Kang et al. |
| 2014/0168138 A1* | 6/2014 | Kuo .................... G06F 3/0412 345/174 |
| 2014/0232617 A1 | 8/2014 | Anite |
| 2014/0267950 A1 | 9/2014 | Kang et al. |
| 2015/0009635 A1 | 1/2015 | Kang et al. |
| 2016/0109747 A1* | 4/2016 | Nodera ............ G02F 1/133345 349/43 |

FOREIGN PATENT DOCUMENTS

| | | |
|---|---|---|
| JP | 2014218394 A | 11/2014 |
| TW | 201127233 A | 8/2011 |
| TW | I439201 B | 5/2014 |
| WO | 2011061961 A1 | 5/2011 |

\* cited by examiner

DISPLAY PANEL

RELATED APPLICATIONS

This application claims priority to Taiwan Application Serial Number 104110968, filed Apr. 2, 2015, which is herein incorporated by reference.

BACKGROUND

Technical Field

Embodiments of the present invention relate to a display panel. More particularly, embodiments of the present invention relate to a display panel that is at least partially flexible.

Description of Related Art

With the increase of audio and video requirements, a large-size display module is gradually emphasized. However, when an electrophoretic display module is desired to be manufactured in a large size, it is very likely to have too low yield rate due to the process difficulty of the electrophoretic display technology. As a result, if desiring to manufacture a large-size electrophoretic display module, a manufacturer typically chooses to combine plural small-size electrophoretic display modules as the large-size electrophoretic display module.

However, an un-viewable area of each small-size electrophoretic display module needs wires and driving components to be arranged thereon. Therefore, when the small-size electrophoretic display modules are joined into a large-size display module, the boundaries among the small-size electrophoretic display modules show large-size dark stripes, thus affecting a viewer's visual perception.

SUMMARY

Embodiments of the present invention reduce the dark stripes shown at the boundaries among the small-size electrophoretic display modules.

In accordance with one embodiment of the present invention, a display panel includes a flexible substrate, a first conductive layer, an insulating layer, a second conductive layer and a display layer. The flexible substrate includes a central area and at least one peripheral area. The first conductive layer is disposed on the flexible substrate. The insulating layer is disposed on the first conductive layer. The insulating layer includes a central insulating portion and at least one peripheral insulating portion. The peripheral insulating portion is located above the peripheral area. The central insulating portion is located above the central area. The peripheral insulating portion is more flexible than the central insulating portion. The second conductive layer is disposed on the insulating layer. The insulating layer separates the first conductive layer from the second conductive layer. The display layer is disposed on the second conductive layer.

In the foregoing embodiment, because the peripheral insulating portion is more flexible than the central insulating portion, the peripheral insulating portion can be bent easily, thus facilitating bending an un-viewable area of the display. Therefore, the un-viewable areas of the display panels can be bent and hidden below the display panels, thereby reducing the areas of the dark stripes at the boundaries among the display panels.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
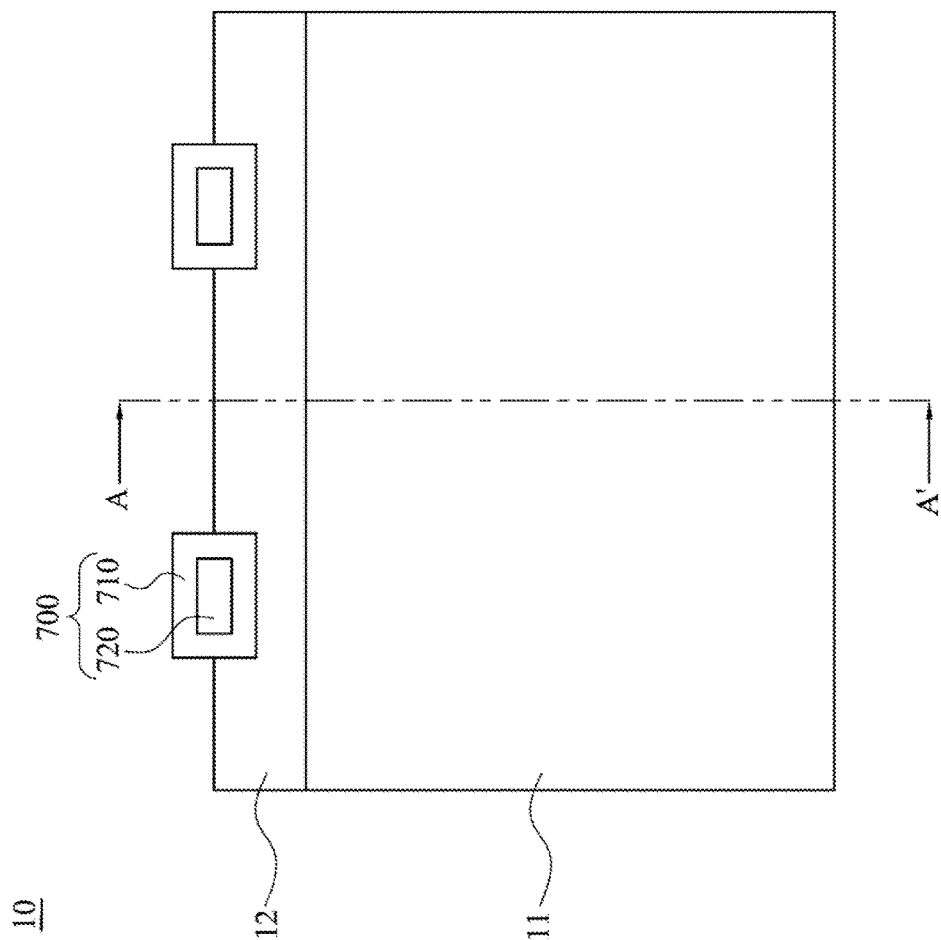
FIG. 1 is a schematic top view of a display panel in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic top view of a display panel in accordance with one embodiment of the present invention. As shown in FIG. 1, the display panel 10 includes a viewable area 11, an un-viewable area 12 and a driving module 700. The viewable area 11 is adjoined to the un-viewable area 12. The driving module 700 is located on the un-viewable area 12. The un-viewable area 12 does not include any display component therein and does not show an image. Therefore, when a display panel 10 is adjoined to another display panel 10, a dark stripe area appears between two adjacent display panels 10, and affects a viewer's visual perception. Therefore, the present invention provides the following technical solutions to reduce the dark stripe area between the adjoined display panels 10.

Figure 2:
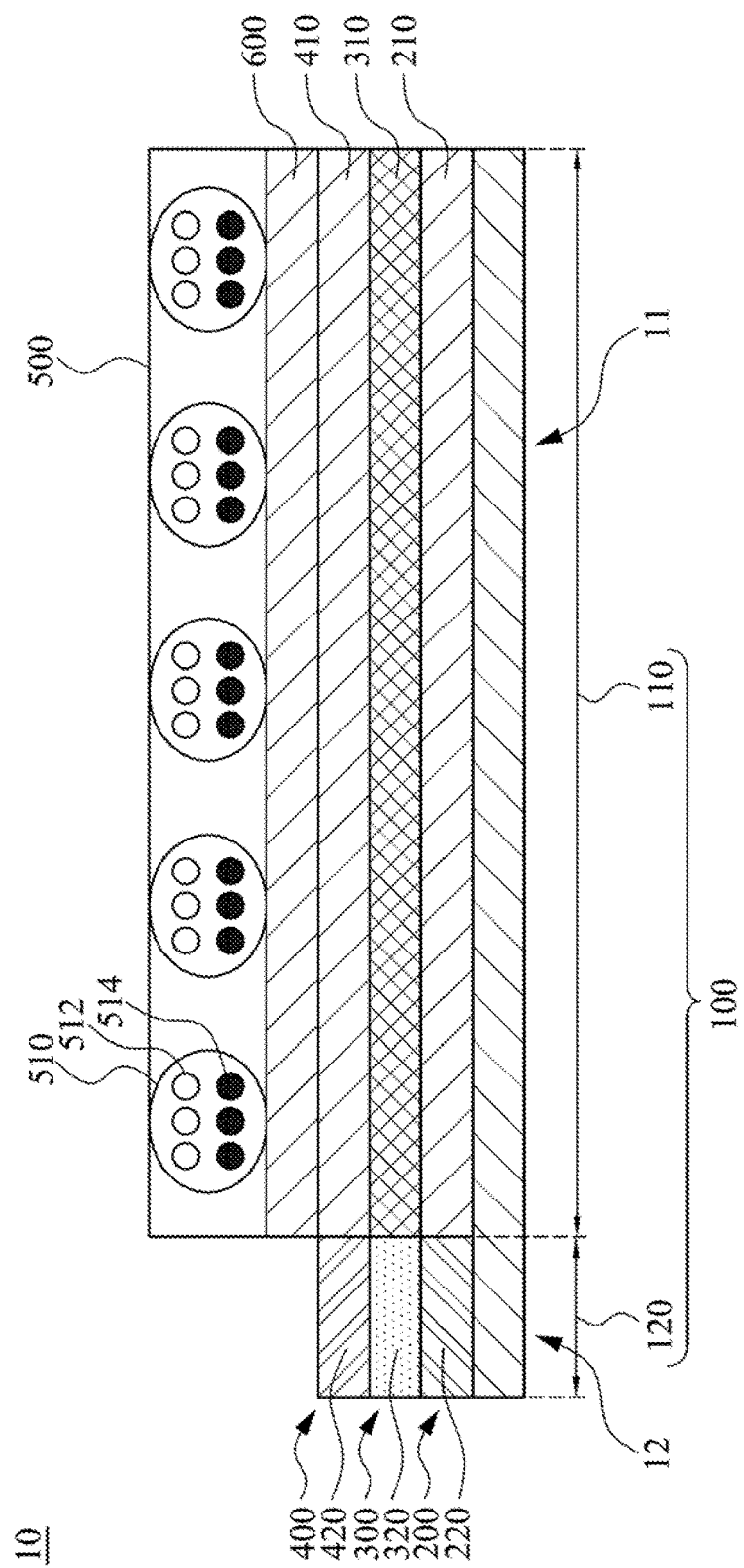
FIG. 2 is a schematic cross-sectional view of the display panel taken along A-A' line in FIG. 1.

Reference is now made to FIG. 2, which is a schematic cross-sectional view of the display panel 10 taken along A-A' line in FIG. 1. As shown in FIG. 2, the display panel 10 includes a flexible substrate 100, a first conductive layer 200, an insulating layer 300, a second conductive layer 400 and a display layer 500. The first conductive layer 200 is disposed on the flexible substrate 100. The insulating layer 300 is disposed on the first conductive layer 200. The second conductive layer 400 is disposed on the insulating layer 300. The insulating layer 300 separates the first conductive layer 200 and the second conductive layer 400. The display layer 500 is disposed on the second conductive layer 400. The flexible substrate 100 includes a central area 110 and at least one peripheral area 120. The central area 110 defines the viewable area 11 of the display panel 10, and the peripheral area 120 defines the un-viewable area 12 of the display panel 10. In other words, the display layer 500 is located above the central area 110, not above the peripheral area 120. The insulating layer 300 includes a central insulating portion 310 and at least one peripheral insulating portion 320. The peripheral insulating portion 320 is adjoined to the central insulating portion 310. In other words, the peripheral insulating portion 320 is in contact with the central insulating portion 310. The central insulating portion 310 is located above the central area 110. The peripheral insulating portion 320 is located above the peripheral area 120. In other words, a projection of the central insulating portion 310 onto the flexible substrate 100 is located within the central area 110, and a projection of the peripheral insulating portion 320 onto the flexible substrate 100 is located within the peripheral area 120.

In this embodiment, the peripheral insulating portion 320 is more flexible than the central insulating portion 310. Therefore, compared to the central insulating portion 310, the peripheral insulating portion 320 is easier to be bent, so that the un-viewable area 12 of the display panel 10 can be bent easily. Therefore, when a number of display panels 10 are joined, the un-viewable areas 12 of the display panels 10 can be bent downward and hidden below the display panels 10, so as to reduce the dark stripe areas at the boundaries among the display panels 10.

In some embodiments, a material of the peripheral insulating portion 320 is different from a material of the central insulating portion 310. For example, the material of the central insulating portion 310 includes an inflexible insulating material, and the material of the peripheral insulating portion 320 includes a flexible insulating material. In particular, the material of the peripheral insulating portion 320 includes an organic insulating material. The organic insulating material may be a compound including carbon, hydrogen and oxygen, which is flexible. The material of the central insulating portion 310 includes inorganic insulating material. The inorganic material may be, but is not limited to be, silicon dioxide or silicon nitride. Since the organic insulating material is flexible and the inorganic insulating material is inflexible, the peripheral insulating portion 320 can be more flexible than the central insulating portion 310, which facilitates bending the un-viewable area 12 of the display panel 10.

In some embodiments, as shown in FIG. 2, the first conductive layer 200 includes a first central conductive portion 210 and at least one first peripheral conductive portion 220. The first peripheral conductive portion 220 is adjoined to the first central conductive portion 210. In other words, the first central conductive portion 210 is in contact with the first peripheral conductive portion 220, and both of them are located on the flexible substrate 100. The first peripheral conductive portion 220 is located between the peripheral insulating portion 320 and the peripheral area 120. The first central conductive portion 210 is located between the central insulating portion 310 and the central area 110.

In some embodiments, the first peripheral conductive portion 220 is more flexible than the first central conductive portion 210. Therefore, compared to the first central conductive portion 210, the first peripheral conductive portion 220 is easier to be bent, such that the un-viewable area 12 of the display panel 10 can be bent easily. Therefore, when a number of display panels 10 are joined, the un-viewable areas 12 of the display panels 10 can be bent downward and hidden below the display panels 10, so as to reduce the dark stripe areas at the boundaries among the display panels 10.

For example, the first peripheral conductive portion 220 and the first central conductive portion 210 both can be formed from metal. The malleability of the metal forming the first peripheral conductive portion 228 is higher than that forming the first central conductive portion 210.

In some embodiments, the first central conductive portion 210 and the first peripheral conductive portion 220 can be formed from the same material. For example, the first central conductive portion 210 and the first peripheral conductive portion 220 may be, but are not limited to be, formed from the metal having high malleability, such as gold, aluminum or silver.

In some embodiments, as shown in FIG. 2, the second conductive layer 400 includes a second central conductive portion 410 and at least one second peripheral conductive portion 420. The second peripheral conductive portion 420 is adjoined to the second central conductive portion 410. In other words, the second central conductive portion 410 is in contact with the second peripheral conductive portion 420, and both of them are located on the insulating layer 300. The second peripheral conductive portion 420 is located on the peripheral insulating portion 320. The peripheral insulating portion 320 separates the first peripheral conductive portion 220 from the second peripheral conductive portion 420. The second central conductive portion 410 is located between the central insulating portion 310 and the display layer 500.

In some embodiments, the second peripheral conductive portion 420 is more flexible than the second central conductive portion 410. Therefore, compared to the second central conductive portion 410, the second peripheral conductive portion 420 is easier to be bent, such that the un-viewable area 12 of the display panel 10 can be bent easily. Therefore, when a number of display panels 10 are joined, the un-viewable areas 12 of the display panels 10 can be bent downwardly and concealed below the display panels 10, so as to reduce the dark stripe areas at the boundaries among the display panels 10.

For example, the second peripheral conductive portion 420 and the second central conductive portion 410 both can be formed from metal. The malleability of the metal forming the second peripheral conductive portion 420 is higher than that forming the second central conductive portion 410.

In some embodiments, the second central conductive portion 410 and the second peripheral conductive portion 420 can be formed from the same material. For example, the second central conductive portion 410 and the second peripheral conductive portion 420 may be, but are not limited to be, formed from the metal having high malleability, such as gold, aluminum or silver.

In some embodiments, as shown in FIG. 1 and FIG. 2, the driving module 700 is located on the un-viewable area 12, and is disposed on the second peripheral conductive portion 420 of the second conductive layer 400. The driving module 700 is electrically connected to the second peripheral conductive portion 420. Because the un-viewable area 12 is flexible, the driving module 700 can be hidden below the display panel 10 when the un-viewable area 12 is bent, so that the driving module 700 will not be seen by the viewer. In some embodiments, the driving module 700 includes a circuit board 710 and a driving chip 720. The driving chip 720 is disposed on the circuit board 710. The circuit board 710 is disposed on the second peripheral conductive portion 420 of the second conductive layer 400. Therefore, the driving chip 720 can be electrically connected to the second conductive layer 400. In some embodiments, the circuit board 710 may be, but is not limited to be, an FPC (flexible printed circuit).

In some embodiments, the first conductive layer 200 includes gate lines, and the second conductive layer 400 includes source lines and drain lines. A semiconductor material (not shown) may be disposed between the first conductive layer 200 and the second conductive layer 400, so as to form a thin film transistor (TFT). When the TFT is conducted, the electric field of the second conductive layer 400 can affect the display layer 500 located above the second conductive layer 400, so as to drive the display layer 500 to show an image.

In particular, as shown in FIG. 2, a material of the display layer 500 includes an electrophoretic material. More particularly, the display layer 500 includes a plurality of microcapsules 510. Each of the microcapsules 510 has ht-colored charged particles 512 and dark-colored charged particles 514. The light-colored charged particle 512 and the dark-colored charged particle 514 have charges in different types. For example, the light-colored charged particles 512 may be positively charged, and the dark-colored charged particles 514 may be negatively charged. Therefore, the light-colored charged particles 512 and the dark-colored charged particles 514 can be moved to a predetermined position by the electric field of the second conductive layer 400, thereby showing an image.

It is understood that the material of the central insulating portion 310 is preferably an inorganic insulating material, such as silicon dioxide or silicon nitride, so that the TFT can provide enough electric force to drive the display layer 500. Because the inorganic insulating material is inflexible, but the organic insulating material is flexible, the material of the peripheral insulating portion 320 is preferably the organic insulating material, so as to bend the un-viewable area 12. As a result, the material of the central insulating portion 310 and the material of the peripheral insulating portion 320 are preferably the inorganic insulating material and the organic insulating material respectively, thereby performing both functions of driving display layer 500 and bending the un-viewable area 12.

In some embodiments, as shown in FIG. 2, the display panel 10 further includes a third conductive layer 600. The third conductive layer 600 is disposed between the second central conductive portion 410 of the second conductive layer 400 and the display layer 500, so as to further improve an aperture ratio of the TFT.

Figure 3:
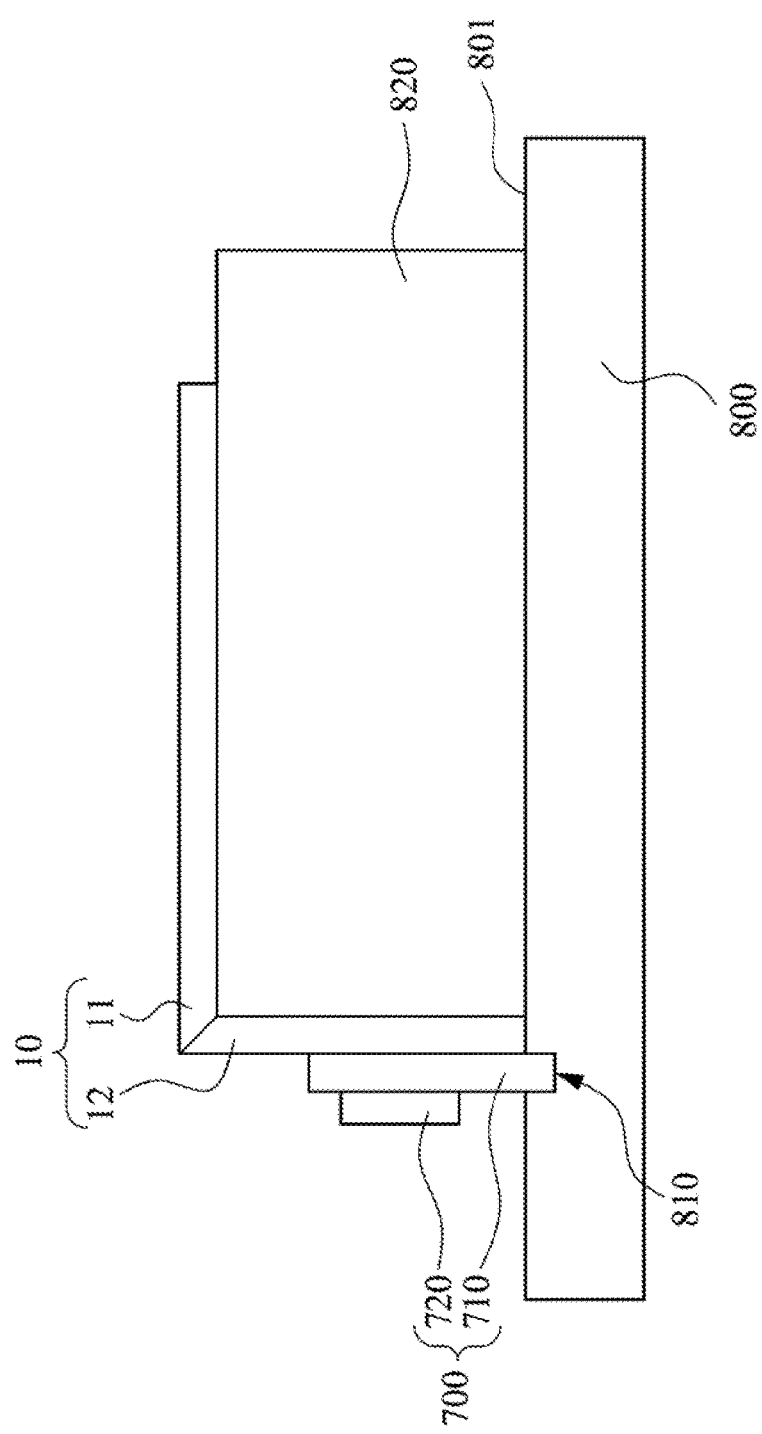
FIG. 3 is a schematic side view of one application of the display panel.

FIG. 3 is a schematic side view of one application of the display panel 10. As shown in FIG. 3, the un-viewable area 12 of the display panel 10 can be bent and secured onto the driving base 800. For example, the driving base 800 has a top surface 801, a slot 810 and a carrier 820. The slot 810 is concave in the top surface 801. The carrier 820 is disposed on the top surface 801. The viewable area 11 of the display panel 10 is located on the carrier 820. The un-viewable area 12 of the display panel 10 can be bent, so as to allow the circuit board 710 of the driving module 700 to be inserted into the slot 810, so that the driving base 800 can drive the viewable area 11 of the display panel 10 to show mages via the driving module 700.

Figure 4:
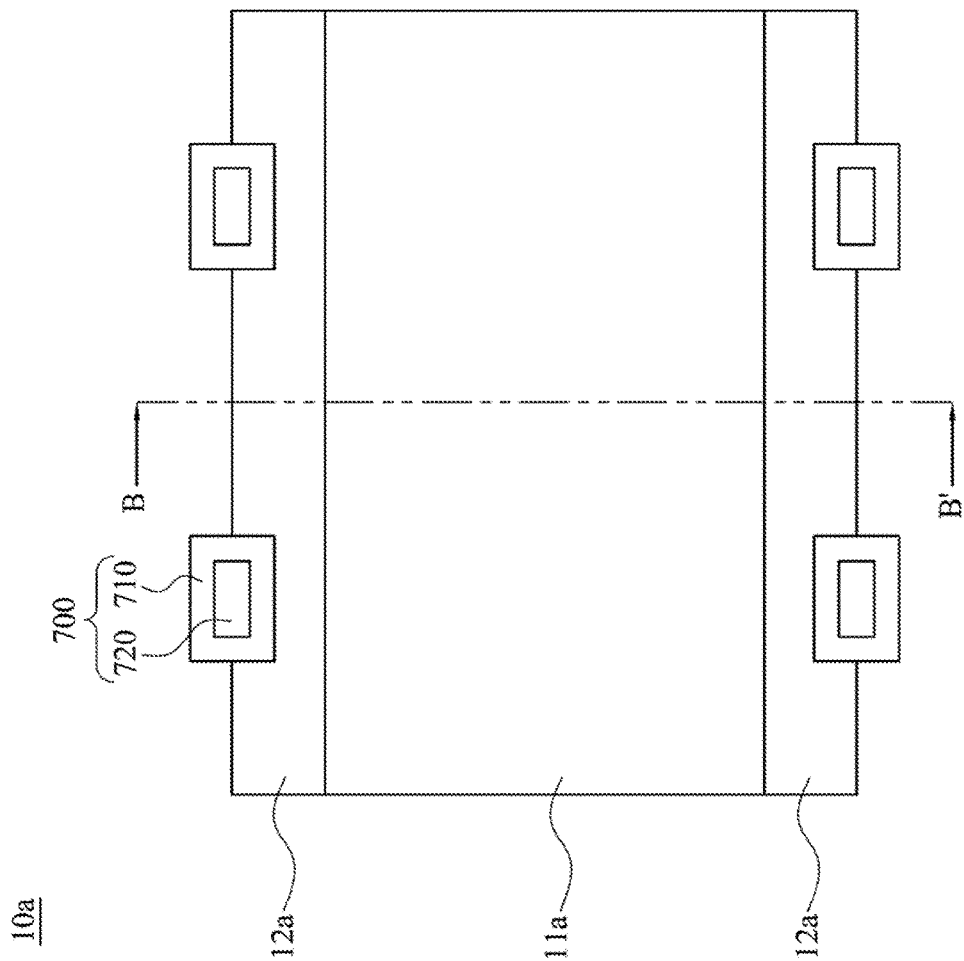
FIG. 4 is schematic top view of the display panel in accordance with another embodiment of the present invention.
Figure 5:
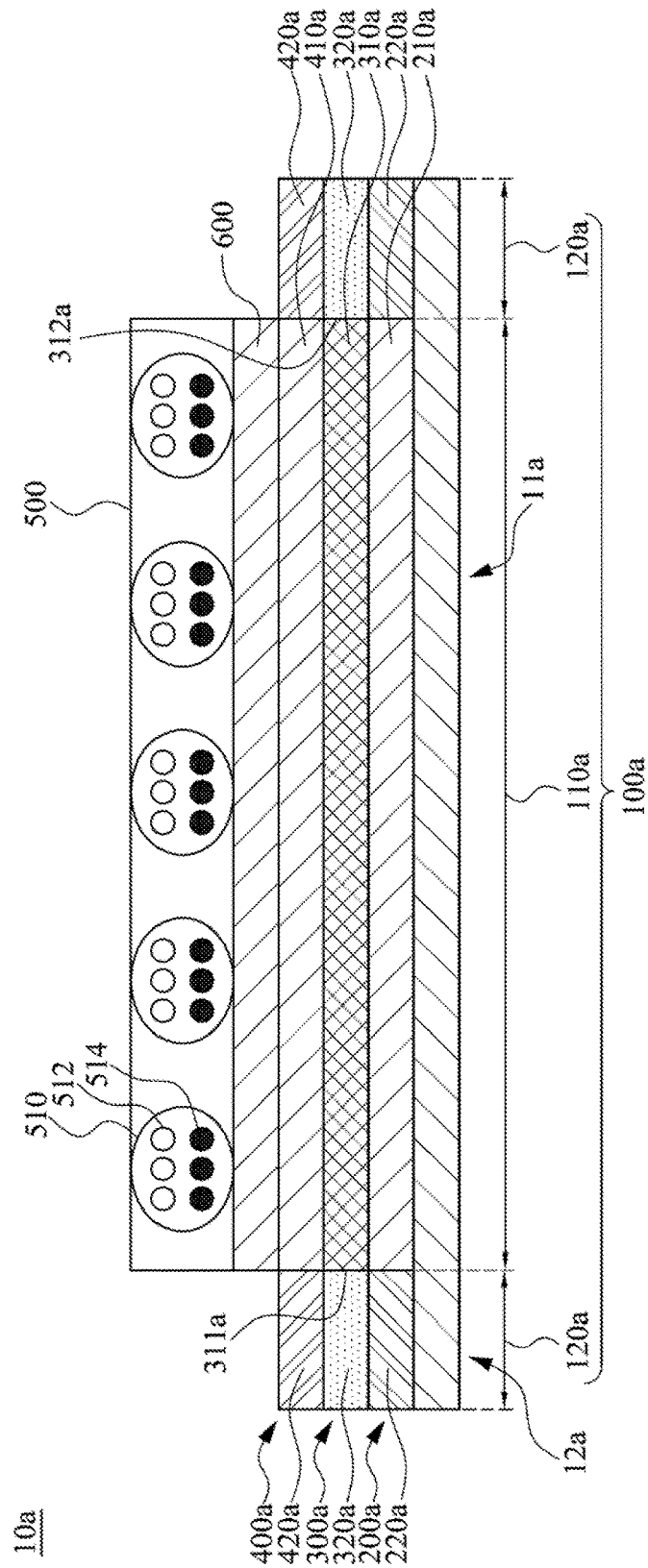
FIG. 5 is a schematic cross-sectional view of the display panel taken along B-B' line in FIG. 4.

FIG. 4 is schematic top view of the display panel 10a in accordance with another embodiment of the present invention. FIG. 5 is a schematic cross-sectional view of the display panel 10a taken along B-B' line in FIG. 4. As shown in FIG. 4 and FIG. 5, the main difference between this embodiment and the foregoing embodiment is that: the display panel 10a has two un-viewable areas 12a. The un-viewable areas 12a are respectively located on two opposite sides of the viewable area 11a. In particular, as shown in FIG. 5, the flexible substrate 100a has two peripheral areas 120a. The peripheral areas 120a are respectively located on two opposite sides of the central area 110a. The number of the peripheral insulating portions 320a of the insulating layer 300a is two. The central insulating portion 310a has two opposite lateral surfaces 311a and 312a. The peripheral insulating portions 320a are respectively adjoined to the lateral surfaces 311a and 312a. The peripheral insulating portions 320a are respectively located above the peripheral areas 120a. The peripheral insulating portions 320a both are more flexible than the central insulating portion 310a, so as to bend the un-viewable areas 12a.

In some embodiments, as shown in FIG. 5, the first conductive layer 200a has two first peripheral conductive portions 220a. The first peripheral conductive portions 220a are located on two opposite sides of the first central conductive portion 210a. Each of the first peripheral conductive portions 220a is located between a corresponding peripheral area 120a and a corresponding peripheral insulating portion 320a. The first peripheral conductive portions 220a both are more flexible than the first central conductive portion 210a, so as to bend the un-viewable areas 12a.

In some embodiments, as shown in FIG. 5, the second conductive layer 400a has two second peripheral conductive portions 420a. The second peripheral conductive portions 420a are located on two opposite sides of the second central conductive portion 410a. Each of the second peripheral conductive portions 420a is located above a corresponding peripheral insulating portion 320a, and is spaced apart from the first peripheral conductive portions 220a. The second peripheral conductive portions 420a both are more flexible than the second central conductive portion 410a, so as to bend the un-viewable areas 12a.

Figure 6:
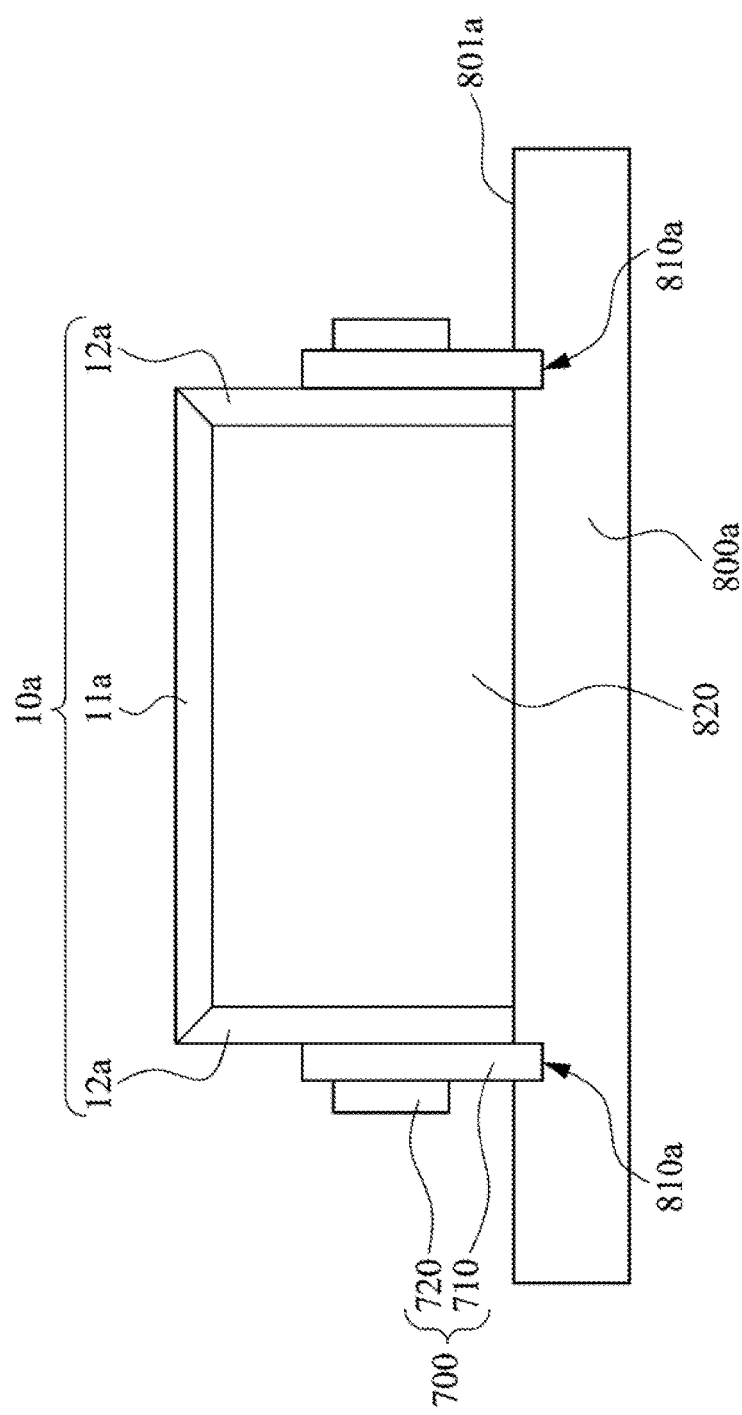
FIG. 6 is a schematic side view of one application of the display panel shown in FIG. 4.

FIG. 6 is a schematic side view of one application of the display panel 10a shown in FIG. 4. As shown in FIG. 6, the un-viewable areas 12a of the display panel 10a both can be bent and secured onto the driving base 800a. For example, the driving base 800a has a top surface 801a, two slots 810a and a carrier 820. The slots 810a are concave in the top surface 801a. The carrier 820 is disposed on the top surface 801a. The viewable area 11a of the display panel 10a is located on the carrier 820. The un-viewable area 12a of the display panel 10a can be bent, so as to allow the circuit boards 710a on the un-viewable areas 12a to be inserted into the corresponding slots 810, so that the driving base 800a can drive the viewable area 11a of the display panel 10a to show images via the driving module 700.

Figure 7:
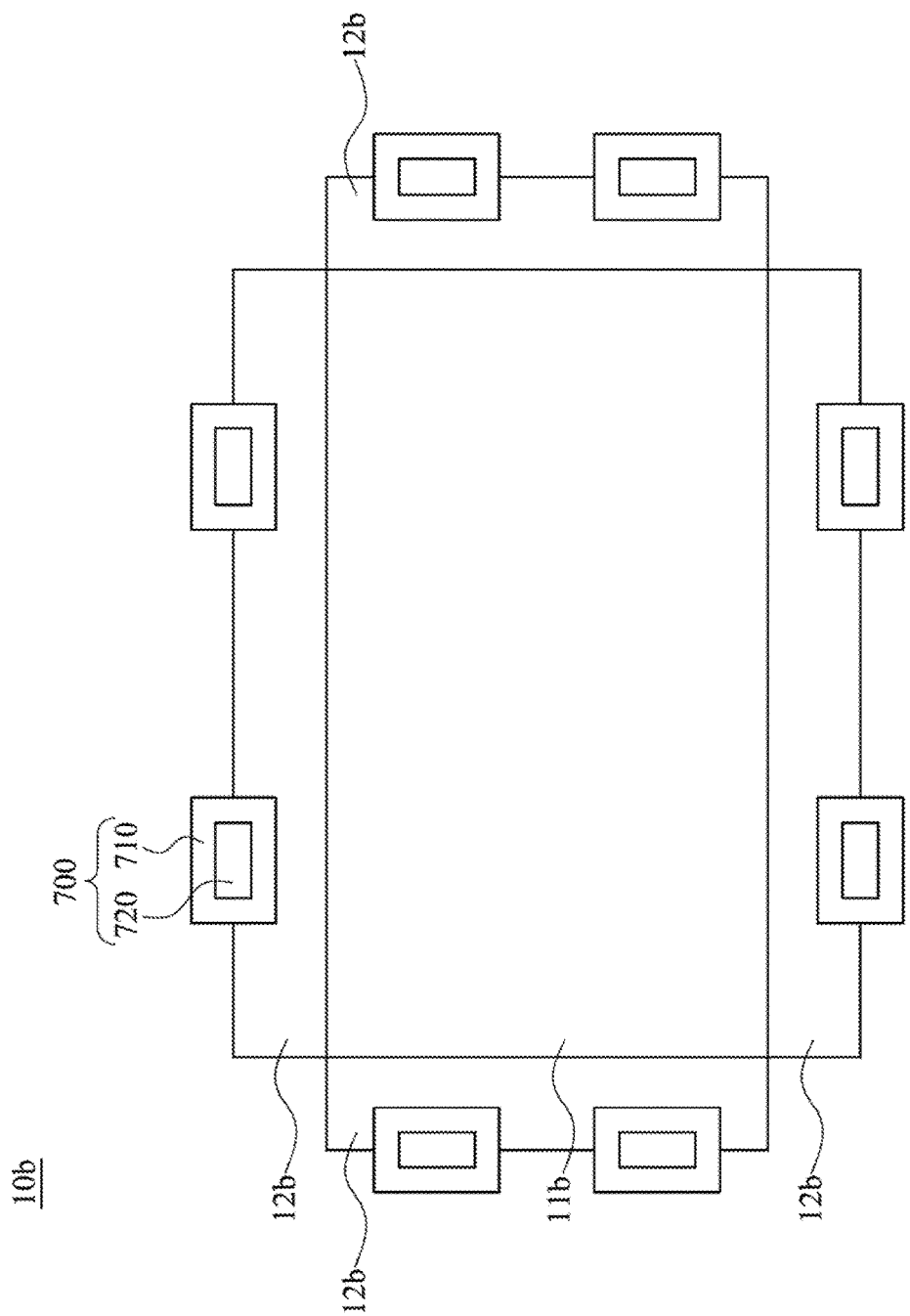
FIG. 7 is schematic top view of the display panel in accordance with another embodiment of the present invention.

FIG. 7 is schematic top view of the display panel 10b in accordance with another embodiment of the present invention. The main difference between this embodiment and the embodiment shown in FIG. 4 is that: the display panel 10b includes four un-viewable areas 12b. Two of the un-viewable areas 12b are respectively located on an upper side and a lower side of the viewable area 11b, and the other two of the un-viewable areas 12b are respectively located on a left side and a right side of the viewable area 11b. The un-viewable areas 12b can all be bent downwardly to reduce the dark area when the display panels 10b are adjoined. Bending the un-viewable areas 12b can be achieved by the flexibility of the peripheral insulating portions, the flexibility of the first peripheral conductive portions and the flexibility of the second peripheral portions described in the aforementioned embodiments, and thus is not described again herein.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display panel, comprising:
   a flexible substrate comprising a central area and at least one peripheral area;
   a first conductive layer disposed on the flexible substrate;
   an insulating layer disposed on the first conductive layer, the insulating layer comprising a central insulating portion made of an inorganic insulating material and at least one peripheral insulating portion made of an organic material, the peripheral insulating portion being located above the peripheral area, the central insulating portion being located above the central area, the peripheral insulating portion being more flexible than the central insulating portion;
   a second conductive layer disposed on the insulating layer, the insulating layer separating the first conductive layer from the second conductive layer, the central insulating portion and the peripheral insulating portion forming an organic/inorganic interface extending from the first conductive layer to the second conductive layer; and
   a display layer disposed on the second conductive layer, the display layer extending over the central insulating portion and terminating prior to reaching a position overlapping the peripheral insulating portion.

2. The display panel of claim 1, wherein the organic material is a compound comprising carbon, hydrogen and oxygen.

3. The display panel of claim 1, wherein the first conductive layer comprises at least one first peripheral conductive portion and a first central conductive portion, wherein the first peripheral conductive portion is located between the peripheral insulating portion and the peripheral area, wherein the first central conductive portion is located between the central insulating portion and the central area, wherein the first peripheral conductive portion is more flexible than the first central conductive portion.

4. The display panel of claim 1, wherein the second conductive layer comprises at least one second peripheral conductive portion and a second central conductive portion, wherein the second peripheral conductive portion is located on the peripheral insulating portion, wherein the second central conductive portion is located between the central insulating portion and the display layer, wherein the second peripheral conductive portion is more flexible than the second central conductive portion.

5. The display panel of claim 1, wherein the peripheral insulating portion is adjoined to the central insulating portion.

6. The display panel of claim 1, wherein the number of the at least one peripheral insulating portion is at least two, and two peripheral insulating portions are respectively adjoined to two opposite lateral surfaces of the central insulating portion.

7. The display panel of claim 1, further comprising a driving module, wherein the second conductive layer comprises at least one second peripheral conductive portion and a second central conductive portion, wherein the second peripheral conductive portion is located on the peripheral insulating portion, wherein the second central conductive portion is located between the central insulating portion and the display layer, wherein the driving module is disposed on the second peripheral conductive portion.

8. The display panel of claim 1, further comprising a third conductive layer disposed between the second conductive layer and the display layer.

9. The display panel of claim 1, wherein a material of the display layer comprises an electrophoretic material.

* * * * *